United States Patent [19]

Albern

[11] 4,139,314
[45] Feb. 13, 1979

[54] INSERT NUT

[75] Inventor: Helmut Albern, Quickborn, Fed. Rep. of Germany

[73] Assignee: ITW Ateco GmbH, Fed. Rep. of Germany

[21] Appl. No.: 886,702

[22] Filed: Mar. 15, 1978

[30] Foreign Application Priority Data

May 12, 1977 [DE] Fed. Rep. of Germany ... 7715076[U]

[51] Int. Cl.² .............................................. F16B 7/00
[52] U.S. Cl. .................................... 403/14; 403/260; 403/407
[58] Field of Search ............... 403/260, 258, 264, 230, 403/231, 237, 8, 7, 21, 407, 406, 405, 14

[56] References Cited

U.S. PATENT DOCUMENTS

| 2,654,923 | 10/1953 | Johnson | 403/8 |
| 3,695,655 | 10/1972 | Wippermann et al. | 403/260 X |
| 4,008,971 | 2/1977 | Wah | 403/260 X |

FOREIGN PATENT DOCUMENTS

| 432177 | 3/1948 | Italy | 403/258 |
| 1148687 | 4/1969 | United Kingdom | 403/258 |
| 529309 | 12/1976 | U.S.S.R. | 403/406 |

Primary Examiner—Andrew V. Kundrat
Attorney, Agent, or Firm—Jack R. Haloorsen; Robert W. Beart

[57] ABSTRACT

A fastener having a generally cylindrical body with a laterally enlarged head spaced frame said body by a web which is transverse to a threaded bore in the cylindrical body and with the body having rib-like extensions disposed perpendicular to the web.

7 Claims, 7 Drawing Figures

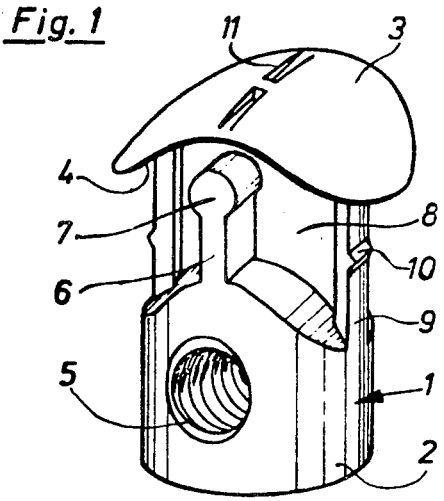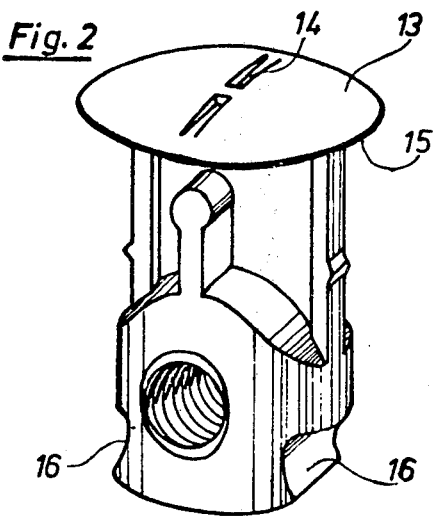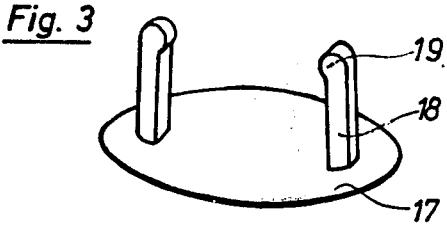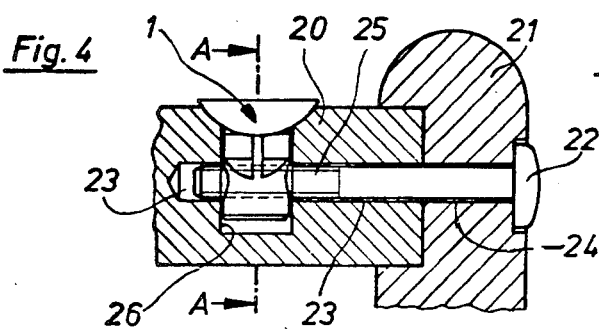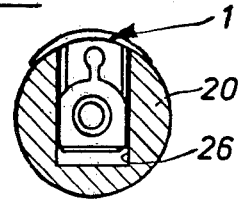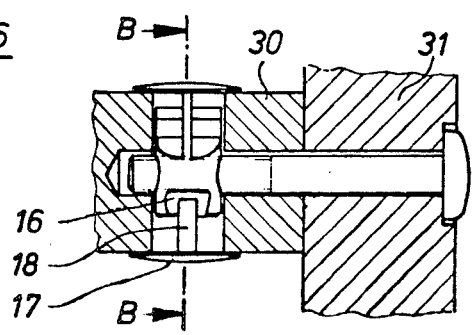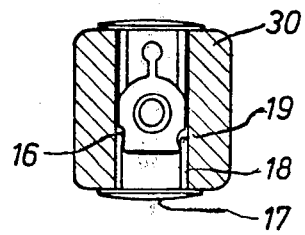

INSERT NUT

The invention relates to a fastener for releasable connection of articles, particularly furniture components, especially of children's cots.

Fasteners of this kind are particularly needed in the furniture industry, in order to connect together components disposed at right angles to one another. A particular case of use here is the connection of circular or flat wooden bars to end or head panels, as occurs for example in cots, in which the longitudinals for the side bars must be connected with the head ends of the cot. Besides this special case of use, in the connection of bars with panels, the fastener made according to the innovation is however also usable in the connection of panel members at right angles to one another (cupboards, shelves etc.) and finally in the connection of rod members at right angles to one another. Furthermore, other possibilities of use are conceivable.

The fasteners primarily employed hitherto for the assembly of cots consist of a pin provided internally and externally with a thread, which is inserted by machine into the end surface of a wooden bar, and a commercially available metric screw. After the insertion of the threaded pin, this is aligned with a bore made in the end wall of the cot, and a screw is passed through the bore and screwed into the threaded pin. This known kind of fastening has the disadvantage that, upon screwing in of the threaded pin into the bore provided for it in the wooden bar, the latter has the tendency to a splintering or to become split. This has the consequence that upon every damage caused by the screwing in of the threaded pin, an entire wooden bar becomes waste, which naturally is correspondingly expensive. Moreover, it is certainly derived from this that, upon completed total assembly and use of the cot, the screwing members do not ensure any long-period fixed assembly, because infants very frequently continuously rattle the head ends or side bars of the cot. In particular, the rattling of the head ends gives rise to a loosening of the screw connection and in some circumstances even to a shearing off of the screwed-in threaded pin, so that the connection becomes ineffective.

The object underlying the innovation is to make available a fastener which can be assembled in a simple and economical manner, without the danger thereby arising of damage to the articles to be connected together, and by means of which an especially secure connection is produced, especially against periodically occurring impact loading.

This object is solved according to the innovation in a fastener as mentioned above, in that it comprises an insert member with a generally cylindrically shaped body and a head laterally enlarged with respect to the latter, with a lower surface intended for abutment against the surface of the article, while the body has a threaded bore extending perpendicularly to its longitudinal axis, and centrally arranged, which is adapted for reception of a commercial screw.

The insert member according to the innovation is not, as with the known threaded pins, screwed into a bar or panel from an end face, but it is inserted into a bore extending perpendicular to the axis of the bar or to the plane of the panel. This bore can either extend through the bar or panel, or it can terminate within the bar or panel. The insert member is then inserted into the bore in such a way that the under face of its head comes into engagement with the surface of the bar or panel. Since the head extends laterally beyond the edge of the bore, an abutment is thus formed, so that the threaded bore provided in the body of the insert member is arranged at a predetermined depth within the bore.

If the insert member is inserted into the bore in the manner described above, the threaded bore arrives at the same level as a bore extending parallel to the bar axis or to the plane of the panel, which extends from the end surface of the bore or the panel into the interior of the bar or panel, and thereby intersects the bore provided for the insert nut. In the aligned condition of the components to be connected, this bore constitutes the prolongation of a bore extending through the other furniture component, so that a commercial screw can be inserted from the far side of the other component into the bores, and screwed into the insert member acting as a nut. In the fully-tightened condition of the screw, the latter extends advantageously through the threaded bore of the insert member and into the prolongation of the screw bore, so that, in the assembled condition, the insert member is trapped on both sides by the screw.

For installation of the fastener formed according to the innovation there are therefore only two bores to be made, namely one for the screw used, and one for the insert member itself. The two bores are at right angles to one another. In the making of the bores, the danger of damage of the components to be connected together is slight. In contrast to the connecting members according to the state of the art, therefore, in the connections made with employment of the fastener according to the innovation, no connecting member itself needs to be screwed into the component to be connected, but the insert member and the screw are simply pushed into the bores provided for them, and screwed to one another. This has the advantage, that during the assembly of the fastener, the components to be connected have not faced any damages. Besides is the fact that, by the arrangement of the fastener and screw at right angles, a long-term fixed condition is ensured, so that, even with periodically occurring impact loadings, for example caused by the rattling of infants, one does not have to reckon on self-loosening of the screw connection. This danger exists especially with the fasteners according to the state of the art, because there the axis of the screwed-in threaded pin runs parallel to the axis of the bar or to the plane of the panel. In a particular embodiment of the fastener according to the innovation, which serves for connection of a round bar with another article, the head of the insert member has a curved-shaped lower abutment surface, and the threaded bore extends perpendicularly to the direction of curvature of the abutment face. It is apparent that in this embodiment a centralising of the insert member into a direction of parallel axes after insertion in the round wooden bar is ensured, so that the threaded bore is always directed exactly to the screw bore. In this way it is ensured that, on insertion of the screw in the bore provided for it, its tip in all cases meets the threaded bore, i.e. an off-centering of the threaded bore of the insert member relatively to the screw bore is excluded.

If the fastener is to be used for connection of an article with a flat surface with another article, then an embodiment is employed in which the head of the insert member has a lower abutment face which is formed flat, and on which on the visible surface of the head a groove extending parallel to the axis of the bore is provided. It is clear that because of the flat-shaped lower abutment surface of the head of the insert member, upon insertion of the latter in the bore provided for it, a direction of the threaded bore towards the screw bore will not be automatically achieved. In order to make possible such an alignment, a groove is provided on the visible surface of the head extending parallel to the axis of the threaded bore, which simplifies the alignment of the insert member during assembly. The insert member must therefore, during insertion into the bore, always be brought into such a position that the groove provided on the visible surface of the head extends parallel to the screw bore.

One embodiment of the fastener according to the innovation is characterised in that the cylindrically shaped body is provided with two opposed flats or recesses, which serve for securing a cover cap lying opposite the head. This embodiment serves for insertion into bores, which extend through a round wooden bar or a panel or another article, and in which therefore the bore opening lying opposite the head of the insert member must be covered. For this purpose a cover cap is employed, which substantially matches the head of the insert member, and which is provided on its under side with two legs, which in the assembled condition engage with their enlarged end portions in the space defined between the wall of the bore and the flats or recesses of the body of the insert member.

One embodiment of the innovation, which shows an excellent combination as regards savings of material and strength and stability, is characterised in that, between the generally cylindrically shaped body and the head, a web is arranged, connecting these together, arranged transverse to the bore axis, corresponding to the width of the body, and that the body has extensions arranged offset by 90° relatively to the web, extending in the direction towards the head, and connected with the web. In this embodiment the generally cylindrically shaped body therefore extends only in a zone around the threaded bore, while, primarily on grounds of saving of material, in the zone towards the head there are arranged only the above-mentioned web and the extensions. However, the web and extensions ensure that the insert member in this zone comes into engagement with the wall of the bore at four portions each arranged offset by 90°, so that the member as a whole possesses sufficient strength or stability for the purpose here in question. These properties are further improved in an embodiment in which the extensions at the ends adjacent to the head have cylindrically shaped enlargements.

Suitably, in the last-described embodiment, the lateral end faces of the web are provided with projections extending beyond the width of the body. In this way a certain toothed engagement with the bore walls is achieved. In another further preferred embodiment, the lateral end zones of the web are broadened as compared with the central zone, so that the abutment surface with the bore walls is enlarged.

Two preferred embodiments of the article according to the innovation are described below with reference to the accompanying drawings in detail. What is shown is:

FIG. 1 a first embodiment of the fastener according to the innovation in perspective view;

FIG. 2 a second embodiment of the fastener according to the innovation in perspective view;

FIG. 3 a cover cap to be employed in combination with the embodiment shown in FIG. 2;

FIG. 4 the fastener shown in FIG. 1 in assembled condition in side elevation, while the components connected are shown in section;

FIG. 5 is a section along the line A—A in FIG. 4;

FIG. 6 the fastener shown in FIG. 2 in side elevation, while the components connected together are shown in section; and FIG. 7 a section along the line B—B in FIG. 6.

If one refers to FIG. 1, one will see a fastener made according to the innovation, which is constructed in the form of an insert member 1 and provided with a generally cylindrically shaped body 2 and a head 3 laterally enlarged with respect to the latter. The head has a lower surface 4 intended for engagement against the surface of the article, which in the present embodiment is made curved. Since the abutment face 4 of the head is made curved, it can engage against the surface of a round wooden bar, so that in this way an abutment is made, which ensures that the insert member 1 always penetrates a predetermined distance into the bore provided for it.

The cylindrically shaped body 2 of the insert member is provided with a threaded bore 5 extending perpendicularly to its longitudinal axis and centrally arranged, which is adapted for reception of a commercial screw. This threaded bore 5, in the embodiment shown in FIG. 1, extends perpendicularly to the direction of curvature of the abutment face 4 of the head, so that on pushing in of the insert member into a bore provided for it, the threaded bore 5 always attains a predetermined direction, if the abutment face 4 of the head comes into engagement with the surface of the article, in this case a round bar.

Between the cylindrically shaped body 2 and the head 3 there is arranged a web 8 connecting them together, arranged transverse to the axis of the bore 5, and corresponding to the width of the body. The lateral end zones 9 of the web 8 are broadened relatively to the central zone, so that the surface of abutment with the wall of the bore provided for the insert member is enlarged. The lateral end surfaces of the web are provided with projections 10 extending beyond the width of the body 2, through which a certain toothed engagement with the wall of the bore for the insert member is achieved. The cylindrical body 2 moreover has extensions 6 arranged offset by 90° relatively to the web 8, extending in the direction towards the head 3, and connected with the web, the ends of which adjacent to the head 3 have cylindrically shaped enlargements 7. On the visible surface of the head 3 there is formed a groove 11, which indicates the direction of the threaded bore 5.

FIG. 4 shows the fastener shown in FIG. 1 in assembled condition. The member 1 is then inserted in a bore 26 extending perpendicularly to the bar axis of a round bar 20, while the head is in corresponding abutment with the surface of the bar. The bore 26 for the insert member is intersected by a bore 23 which extends from the end face of the round bar parallel to the axis of the latter. The component 21 to be connected with the round bar 20, which can likewise be a round bar, or any otherwise formed component, is provided with a bore 24 running perpendicularly to its axis or plane, which, in the aligned condition of the components 20 and 21 is directed along the bore 23. From the other side of the component 21, a commercial screw 22 is pushed into the bores 23, 24, and the threaded portion 25 of this screw is screwed up into the threaded bore 5 of the insert member 1. The insert member 1 thus operates as a nut, while the screw thread 25 does not engage the walls of the bores 23, 24.

FIG. 5 shows a section along the line A—A in FIG. 4, from which can be clearly seen how the undersurface 4 of the head 3 of the insert member covering the bore 26 abuts the surface of the round bar 20, when the insert member has been fully pushed into the bore 26. The surface of the cylindrical body 2, as well as the lateral end surfaces of the enlarged web zones 9 and the lateral end surfaces of the extensions 6 then engage the wall of the bore 26.

In FIG. 2 is shown a further embodiment of the fastener according to the innovation. This embodiment corresponds substantially to that shown in FIG. 1, so that further consideration will only be given to the features differing in comparison with the previously discussed embodiment. The embodiment shown in FIG. 2 serves for connection of an article with a flat surface, for example a rectangular bar or a panel, with another article, and therefore has a head 13, which is provided with a flat-shaped lower abutment surface 15. It is clear that with this embodiment, by the shape of the head, no automatic alignment of the threaded bore 5 with the screw bore 23 can be achieved. In order to make possible alignment of this kind, a groove 14 extending parallel to the axis of the threaded bore is provided on the visible surface of the head 13.

The cylindrical body of the insert member is provided in its lower end zone with two opposite recesses 16, which serve for securing a cover cap 17 opposite the head. It is apparent that with a bore for the insert member extending completely through the component to be connected, the end of the bore opposite the head 13 must be covered. The cover cap 17 mentioned serves for this purpose, and it is formed substantially identical with the head 11. FIG. 6 shows the insert member of FIG. 2 and the cover cap in assembled condition. It will be seen that the legs extending from the inner side of the cover cap 17 engage with their enlarged end portions 19 in the recesses 16 of the body of the insert member, and, as FIG. 7 particularly shows, are trapped between the bore walls and the body wall of the recesses. In FIGS. 6 and 7 an insert member is shown, that has been inserted in a bore provided in a rectangular bar 30. The rectangular bore 30 is connected with a panel-like component 31. It is clear that the fastener according to the innovation can be used for connection of any other shapes of component.

The preferred manufacturing material for the fastener according to the innovation is plastics. Suitable plastics, which have the necessary strength and elasticity for the purpose of use in question, are known to the expert.

I claim:

1. Fastener for releasable connection of articles, particularly furniture components, characterized in that it comprises an insert member (1) with a generally cylindrically shaped body (2) and a head (3, 13) laterally enlarged with respect to said body, said head having a lower surface (4,15) intended for abutment against the surface of the article, while the body (2) has a threaded bore (5) extending perpendicularly to its longitudinal axis, and centrally arranged, which is adapted for reception of a screw (22) said generally cylindrically shaped body (2) and said head (3, 13) are maintained in spaced relation by a web which is arranged transverse to the bore axis and connects them together, said web has a width substantially corresponding to the width of said body, said body (2) further includes rib-like extensions (6) which are disposed perpendicular with respect to the web, said extentions (6) extend from said body in the direction towards the head and are disposed on opposite sides of and connected with said web.

2. Fastener according to claim 1 for connection of a round bar with another article, characterized in that the head (3) of the insert member (1) has a curved-shaped lower abutment surface (4), and that the axis of threaded bore (5) extends parallel to the axis of the curvature of the abutment surface (4).

3. Fastener according to claim 1 for connection of an article with a flat surface with another article, characterized in that the head (13) of the insert member has a flat-shaped lower abutment surface (15), and that a groove (14) extending parallel to the axis of the bore is provided on the visible surface of the head (13).

4. Fastener according to claim 1 characterized in that the cylindrically shaped body (2) is provided with two oppositely disposed recess means (16), which accept engaging means (18, 19) for securing a cover gap (17) in spaced opposition to the head (3).

5. Fastener according to claim 1 characterized in that the extensions (6) have cylindrically shaped enlargements (7) at the ends adjacent to the head.

6. Fastener according to claim 5 characterized in that the lateral edge zones (9) of the web (8) are broadened relative to the central zone to form strut-like portions.

7. Fastener according to claim 6 characterized in that the strut-like lateral edge surfaces of the web (8) are provided with projections (10) extending beyond the diametral width of the body.

* * * * *